(12) United States Patent
Vandermeijden et al.

(10) Patent No.: US 9,471,173 B2
(45) Date of Patent: Oct. 18, 2016

(54) CAPACITIVE INPUT SENSING IN THE PRESENCE OF A UNIFORM CONDUCTOR

(71) Applicant: Synaptics Incorporated, San Jose, CA (US)

(72) Inventors: Tom Vandermeijden, Los Gatos, CA (US); Masaaki Shiomura, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 24 days.

(21) Appl. No.: 14/319,605

(22) Filed: Jun. 30, 2014

(65) Prior Publication Data

US 2015/0378496 A1 Dec. 31, 2015

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04108* (2013.01)

(58) Field of Classification Search
CPC .................. G06F 3/044; G06F 2203/04107
USPC ........................................................ 345/173
See application file for complete search history.

(56) References Cited

U.S. PATENT DOCUMENTS

| 2010/0182273 | A1* | 7/2010 | Noguchi ............. G02F 1/13338 345/174 |
| 2012/0068967 | A1* | 3/2012 | Toubiana ................ G06F 3/014 345/174 |
| 2012/0120017 | A1 | 5/2012 | Worfolk et al. |
| 2012/0287077 | A1 | 11/2012 | Pant et al. |
| 2013/0113755 | A1* | 5/2013 | Kwak ..................... G06F 3/044 345/174 |
| 2015/0277720 | A1* | 10/2015 | Thorson ............. G06F 3/04847 345/174 |

* cited by examiner

*Primary Examiner* — Long D Pham
(74) *Attorney, Agent, or Firm* — Patterson + Sheridan, LLP

(57) ABSTRACT

In an example, a processing system for a capacitive input device includes: a sensor module including sensor circuitry, the sensor module configured to: operate a plurality of sensor electrodes to determine input in a sensing region of the input device; a determination module configured to: determine that an input surface of the input device is at least partially interfacing a uniform conductor; and determine a displacement of at least part of the uniform conductor from a region of the input surface by an input object based at least in part on a change in capacitance measured on a subset of the plurality of sensor electrodes; determine at least one of a presence or position of the at least one input object on the input surface based on the determined displacement.

20 Claims, 11 Drawing Sheets

CAPACITIVE INPUT SENSING IN THE PRESENCE OF A UNIFORM CONDUCTOR

BACKGROUND

1. Field of the Disclosure

Embodiments generally relate to input sensing and, in particular, to capacitive input sensing in the presence of a uniform conductor.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Input objects can be at or near the surface of the proximity sensor device ("touch sensing") or hovering over the surface of the proximity sensor device ("proximity sensing" or "hover sensing"). Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices that employ changes in capacitance to sense input object(s) can be detrimentally affected when the input object(s) are in the presence of a uniform conductor. For example, if a capacitive sensing device is submerged in water, the water, a uniform conductor, saturates the device. When the device is saturated, changes in capacitance caused by the input object(s) are difficult if not impossible to detect.

SUMMARY

Embodiments generally provide a processing system, input device and method of capacitive input sensing in the presence of a uniform conductor. In an embodiment, a processing system for a capacitive input device includes a sensor module including sensor circuitry and a determination module. The sensor module is configured to operate a plurality of sensor electrodes to determine input in a sensing region of the input device. The determination module is configured to determine that an input surface of the input device is at least partially interfacing a uniform conductor, determine a displacement of at least part of the uniform conductor from a region of the input surface by an input object based at least in part on a change in capacitance measured on a subset of the plurality of sensor electrode, and determine at least one of a presence or position of the at least one input object on the input surface based on the determined displacement.

In an embodiment, an input device includes sensor electrodes disposed proximate an input surface and a processing system coupled to the sensor electrodes. The processing system is configured to transmit a sensing signal onto a first plurality of the sensor electrodes, receive resulting signals comprising the sensing signal and effects of input in a sensing region from a second plurality of the sensor electrodes, determine that an input surface is at least partially interfacing a uniform conductor based on a saturation of resulting signals from a subset of the second plurality of sensor electrodes, and determine the presence of the input based at least in part on a displacement of at least part of the uniform conductor from a region of the input surface by a dielectric input object.

In an embodiment, a method of operating an input device comprising capacitive sensing using sensor electrodes includes: driving sensing signals onto a first plurality of the sensor electrodes; receiving resulting signals from a second plurality of the sensor electrodes; determining that an input surface is at least partially interfacing a uniform conductor; and determining the presence of input in a sensing region of the input device based at least in part on a displacement of at least part of uniform conductor from a region of the input surface by a dielectric input object.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other equally effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

Figure 1:
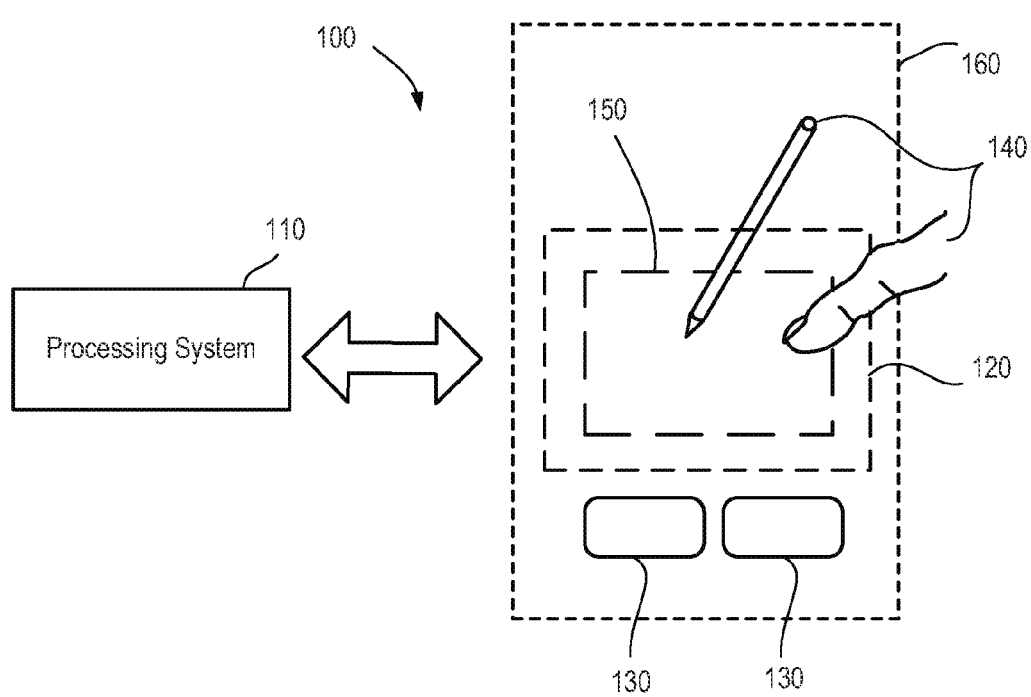
FIG. 1 is a block diagram of a system that includes an input device according to an example implementation.

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide input devices and methods that provide a capacitive sensing device configured for capacitive sensing of input object(s) in the presence of a uniform conductor. In an example, an input device can include a sensing device that employs a plurality of sensor electrodes. The sensing device operates the plurality of sensor electrodes to determine input in a sensing region of the input device. The sensing device can detect when the input surface is at least partially and uniformly interfacing a region of a conductor (referred to herein as a "uniform conductor"), such as when the input surface is at least partially submerged in water. The sensing device can operate in a first mode when the uniform conductor is not detected and in a second mode when the uniform conductor is detected.

In the first mode, the sensing device can determine the presence and/or position of input objects) based on changes in capacitance measured by the sensor electrodes while in proximity to conductive portion(s) of the input object(s). In one example of the second mode, the sensing device can determine the presence and/or position of input object(s) based at least in part on a determined displacement of at least part of the uniform conductor from a region of the input surface by the input object(s). In an example, the second mode allows the sensing device to detect input in a region of the input surface that is submerged in water or otherwise in the presence of a uniform conductor. Contrast between the input object(s) and the uniform conductor is a function of the dielectric constant of a dielectric of the input object(s), the distance the uniform conductor is displaced from the input surface, and the extent to which the uniform conductor remains between the dielectric and the input surface. Example dielectric materials include non-conductive elastomers (e.g., rubbers), air bubbles, and hydrophobic and non-conductive fluids. The sensing device can preprocess the measured sensor signals received while in the second mode to, for example, compensate for a baseline and/or compensate for dielectric residue on the input surface.

In another example of the second mode, the sensing device can determine a deflection response in measured sensor signals indicative of force input applied to the input surface while in the presence of the uniform conductor. For example, force input can deflect the input surface relative to a display or other substrate overlapped by the input surface. The sensing device can determine presence of force input based on the determined deflection response. In another example, the sensing device can determine presence and/or position of input using a combination of determining uniform conductor displacement and a deflection response. These and further aspects are described further below.

Turning now to the figures, FIG. 1 is a block diagram of an exemplary input device 100 in accordance with embodiments. In various embodiments, the input device 100 comprises a sensing device and optionally a display device 160. In other embodiments, the input device 100 comprises a display device having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and or parallel connections). Examples include $I^2C$, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components of the processing system 110 are located together, such as near sensing element(s) of the input device 100. In other embodiments, components of processing system 110 are physically separate with one or more components close to sensing elements) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing elements) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments are described in the context of a fully functioning apparatus, the mechanisms of the embodiments are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
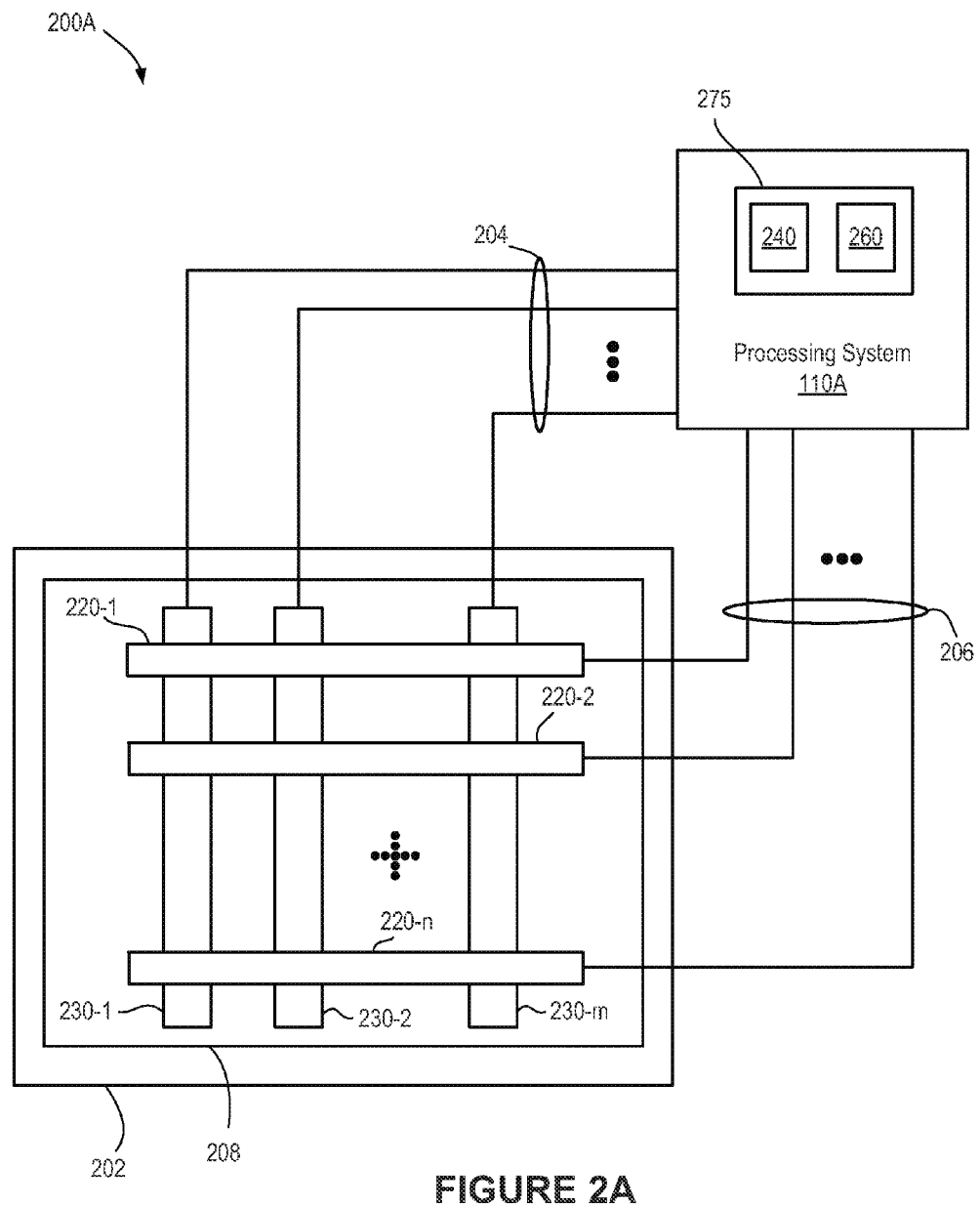
FIG. 2A is a block diagram depicting a capacitive sensor device according to an example implementation.

FIG. 2A is a block diagram depicting a capacitive sensor device 200A according to an example implementation. The capacitive sensor device 200A comprises an example implementation of the input device 100 shown in FIG. 1. The capacitive sensor device 200A includes a sensing device 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.).

The sensing device 208 is disposed on a substrate 202 to provide the sensing region 120. The sensing device 208 includes sensor electrodes disposed on the substrate 202. The sensor electrodes function as sensing elements 150 of the sensing device 208. In the present example, the sensing device 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensing device 208 is shown with the sensor electrodes 220, 230 generally arranged in a rectangular grid of intersections of orthogonal sensor electrodes. It is to be understood that the sensing device 208 is not limited to such an arrangement, but instead can include numerous sensor patterns. Although the sensing device 208 is depicted as rectangular, the sensing device 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). The sensor electrodes 230 can have the same or different geometry as the sensor electrodes 220. In an example, the sensor electrodes 230 are wider and more closely distributed than the sensor electrodes 220, which are thinner and more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
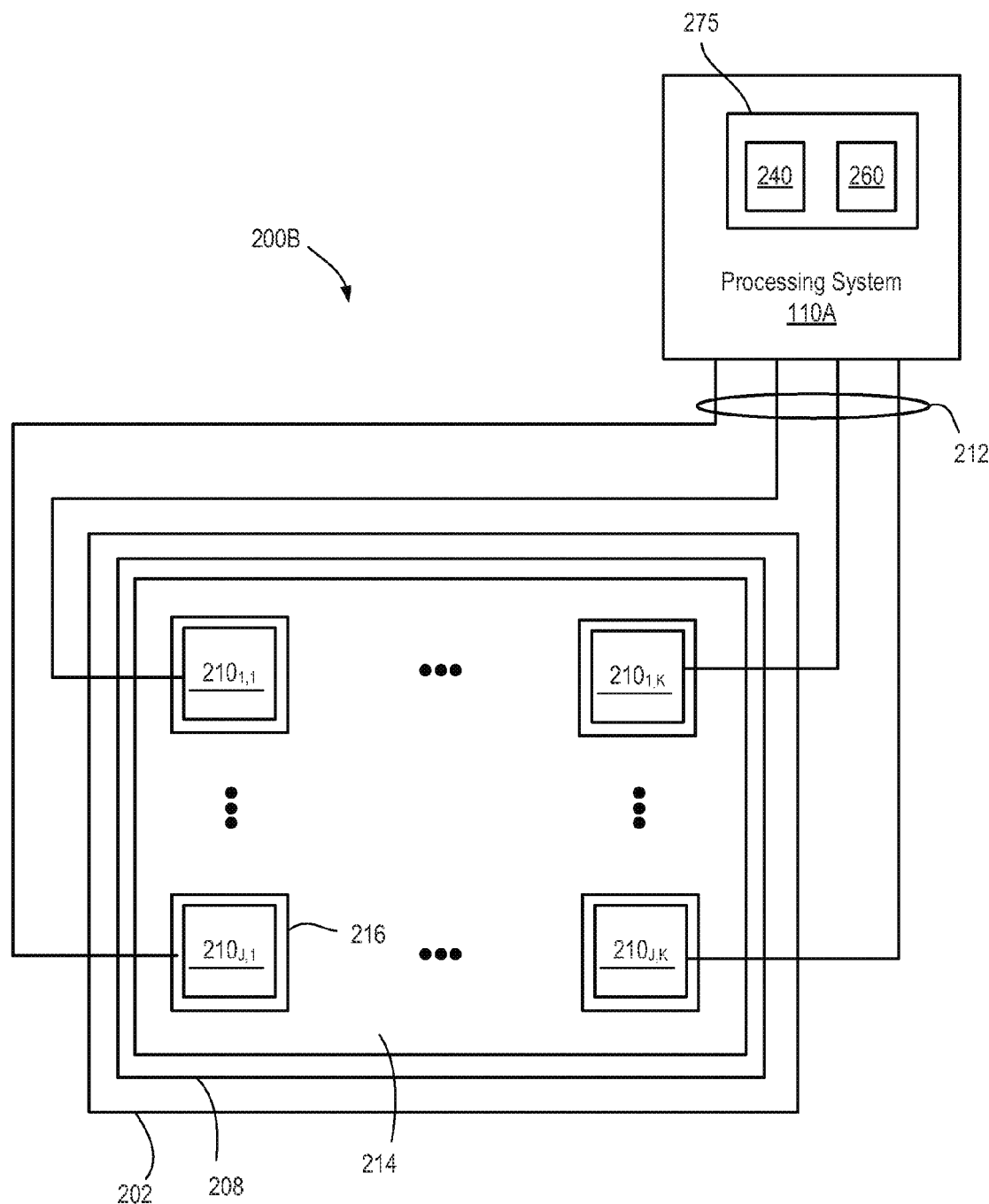
FIG. 2B is a block diagram depicting another capacitive sensor device according to an example implementation.

FIG. 2B is a block diagram depicting a capacitive sensor device 200B according to an example implementation. The capacitive sensor device 200B comprises another example implementation of the input device 100 shown in FIG. 1. In the present example, the sensing device 208 includes a plurality of sensor electrodes $210_{1,1}$ through $210_{J,K}$, where J and K are integers (collectively "sensor electrodes 210"). The sensor electrodes 210 are capacitively coupled to a grid electrode 214. The sensor electrodes 210 are ohmically isolated from each other and the grid electrode 214. The sensor electrodes 210 can be separated from the grid electrode 214 by a gap 216. In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. Similar to the capacitive sensor device 200A, the processing system 110A can operate the sensor electrodes 210 and the grid electrode 214 according to a plurality of excitation schemes, including excitation scheme(s) for transcapacitive sensing and/or absolute capacitive sensing.

In some examples, the sensor electrodes 210 and the grid electrode 214 can be disposed on separate layers of the substrate 202. In other examples, the sensor electrodes 210 and the grid electrode 214 can be disposed on a single layer of the substrate 202. The electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The sensor electrodes 210 are coupled to the processing system 110A by conductive routing traces 212. The processing system 110A can also be coupled to the grid electrode 214 through one or more routing traces (not shown for clarity). The processing system 110A is coupled to the sensor electrodes 210 through the conductive routing traces 212 to implement the sensing region 120 for sensing inputs.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensing device 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensing device 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensing device 208.

In general, the processing system 110A excites or drives sensing elements of the sensing device 208 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110A drives sensing element(s) of the sensing device 208 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110A can determine measurements) of capacitance from the sensed charge. In another example, the processing system 110A drives sensing element(s) of the sensing device 208 with charge and senses resulting respective voltage on sensing element(s). That is, the sensing signal is a signal to cause accumulation of charge (e.g., current signal) and the resulting signal is a voltage signal. The processing system 110A can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110A can include a sensor module 240 and a determination module 260. The sensor module 240 and the determination module 260 comprise modules that perform different functions of the processing system 110A. In other examples, different configurations of one or more modules can perform the functions described herein. The sensor module 240 and the determination module 260 can include circuitry 275 and can also include firmware, software, or a combination thereof operating in cooperation with the circuitry 275.

The sensor module 240 selectively drives sensing signal(s) on one or more sensing elements of the sensing device 208 over one or more cycles ("excitation cycles") in accordance with one or more schemes ("excitation schemes"). During each excitation cycle, the sensor module 240 can selectively sense resulting signal(s) from one or more sensing elements of the sensing device 208. Each excitation cycle has an associated time period during which sensing signals are driven and resulting signals measured.

In one type of excitation scheme, the sensor module 240 can selectively drive sensing elements of the sensing device 208 for absolute capacitive sensing. In absolute capacitive sensing, the sensor module 240 drives selected sensing element(s) with an absolute sensing signal and senses resulting signal(s) from the selected sensing element(s). In such an excitation scheme, measurements of absolute capacitance between the selected sensing element(s) and input object(s) are determined from the resulting signal(s). In an example, the sensor module 240 can drive selected sensor electrodes 220, and/or selected sensor electrodes 230, with an absolute sensing signal. In another example, the sensor module 240 can drive selected sensor electrodes 210 with an absolute sensing signal.

In another type of excitation scheme, the sensor module 240 can selectively drive sensing elements of the sensing device 208 for transcapacitive sensing. In transcapacitive sensing, the sensor module 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 240 can drive the sensor electrodes 230 with transmitter signal(s) and receive resulting signals on the sensor electrodes 220. In another example, the sensor module 240 can drive selected sensor electrodes 210 with transmitter signal(s), and receive resulting signals from others of the sensor electrodes 210.

In any excitation cycle, the sensor module 240 can drive sensing elements of the sensing device 208 with other signals, including reference signals and guard signals. That is, those sensing elements of the sensing device 208 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor module 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensing device 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor module 240 to produce an x/y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110A can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110A, such as capacitive image(s) or capacitive profile(s), enable the sensing of contact, hovering, or other user input with respect to the formed sensing regions by the sensing device 208. The determination module 260 can utilize the measurements of capacitance to determine positional information with respect to a user input relative to the sensing regions formed by the sensing device 208. The determination module 260 can additionally or alternatively use such measurement(s) to determine input object size and/or input object type.

The processing system 110A can operate in multiple modes. The processing system 110A can operate in a first mode when a uniform conductor interfacing with the input surface is not detected. In the first mode, the input can be conductive input object(s) in proximity to the input surface (e.g., touching or hovering), and/or force(s) applied to the input surface that cause deflection of the input surface relative to a substrate. The conductive input object(s) and/or force(s) generate the changes in capacitance detected by the determination module 260.

The processing system 110A can operate in a second mode when a uniform conductor at least partially interfaces with the input surface. In the second mode, the input can be dielectric input object(s) in proximity to the input surface, and/or forces applied to the input surface. The presence of the uniform conductor saturates resulting signals obtained by the sensor module 240. Dielectric input object(s) in proximity to the input surface can displace at least part of the uniform conductor from a region of the input surface. The displacement results in de-saturation of at least some resulting signals obtained from sensor electrode(s) proximate the region in which the uniform conductor has been displaced. Force(s) applied to the input surface can increase the distance between sensor electrodes, which can also result in de-saturation of at least some resulting signals. The determination module 260 can detect changes in capacitance generated by the dielectric input object(s) and/or force(s).

Figure 3A:
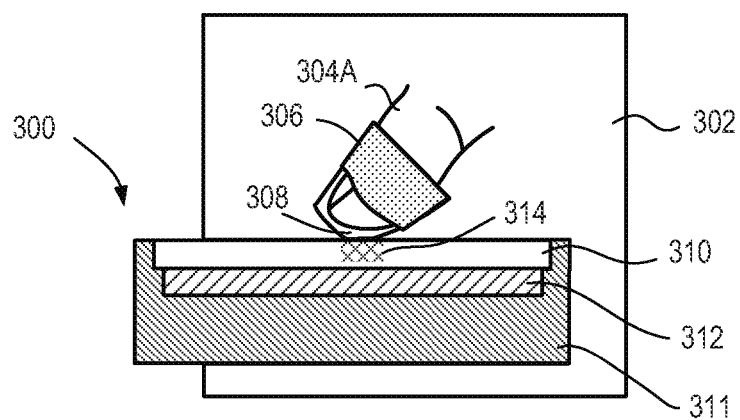
FIGS. 3A-3C show cross-sectional side views of input objects interacting with an input device according to example implementations.
Figure 3B:
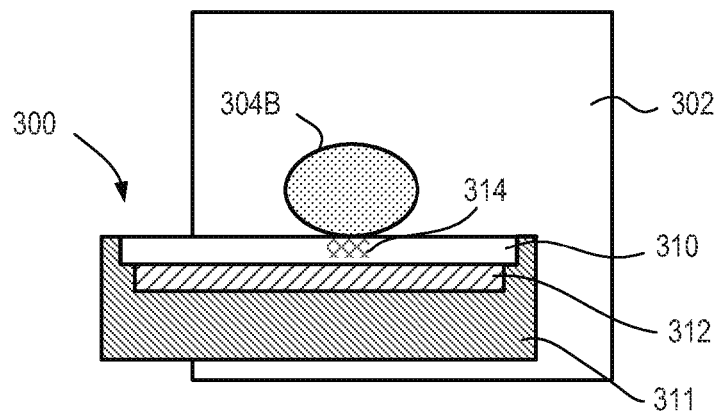
Figure 3C:
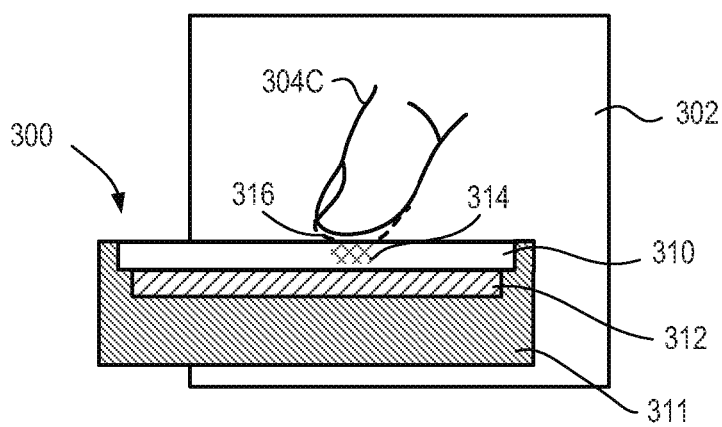

FIGS. 3A-3C show cross-sectional side views of input objects interacting with an input device 300 according to example implementations. The input device 300 generally includes an input surface 310 and a capacitive sensor device 312 mounted in an enclosure 311. The input surface 310 is shown as partially interfacing a uniform conductor 302. In some examples, the input surface 310 can be completely interfacing the uniform conductor 302. In an example, the uniform conductor can be a conductive liquid, such as water, and the input surface 310 can be at least partially submerged in the water. The enclosure 311 isolates the capacitive sensor device 312 and other electronics (not shown) from the uniform conductor. For example, the enclosure 311 can be a water-resistant shell, case, or the like of a mobile device.

As shown in FIG. 3A, an input object 304A contacts the input surface 310. The input object 304A includes a dielectric portion 306 that contacts the input surface 310. In the example, the input object 304A also includes a conductive portion (e.g., a finger) that is insulated from the input surface 310 by the dielectric portion 306. For example, the dielectric portion 306 can be a thimble, glove, sleeve, or like type structure attached to the conductive portion. The dielectric portion 306 can be formed of a non-conductive elastomer, such as rubber, neoprene, or the like. In some examples, the dielectric portion 306 can also include an air-gap 308 that further isolates a conductive portion of the input object 304A from the input surface 310. The dielectric portion 306 conforms to the input surface 310 and displaces at least part of the uniform conductor 302 in a region 314 of the input surface 310. Although the input object 304A is shown as having a conductive portion and the dielectric portion 306, in other examples the input object 304A can be formed entirely of a dielectric (e.g., a dielectric stylus or the like).

As shown in FIG. 3B, an input object 304B is a gas bubble that contacts the input surface 310. The gas bubble is formed by a source (not shown). For example, a person can place her lips against the input surface 310 and form an air bubble that contacts the input surface 310. Alternatively, a stylus capable of producing a gas bubble and contacting the gas bubble against the input surface 310 can be employed. The gas bubble conforms to the input surface 310 and displaces at least part of the uniform conductor 302 in the region 314 of the input surface 310.

As shown in FIG. 3C, an input object 304C contacts the input surface 310. The input object 304C includes a dielectric portion 316 that contacts the input surface 310. In the example, the input object 304C also includes a conductive portion (e.g., a finger) that is insulated from the input surface 310 by the dielectric portion 316. The dielectric portion 316 can be a hydrophobic and non-conductive fluid. The dielectric portion 316 can have a viscosity such that the dielectric portion 316 adheres to the conductive portion of the input object 304C in the presence of the uniform conductor 302. The dielectric portion 316 conforms to the input surface 310 and displaces at least part of the uniform conductor 302 in the region 314 of the input surface 310.

Figure 4A:
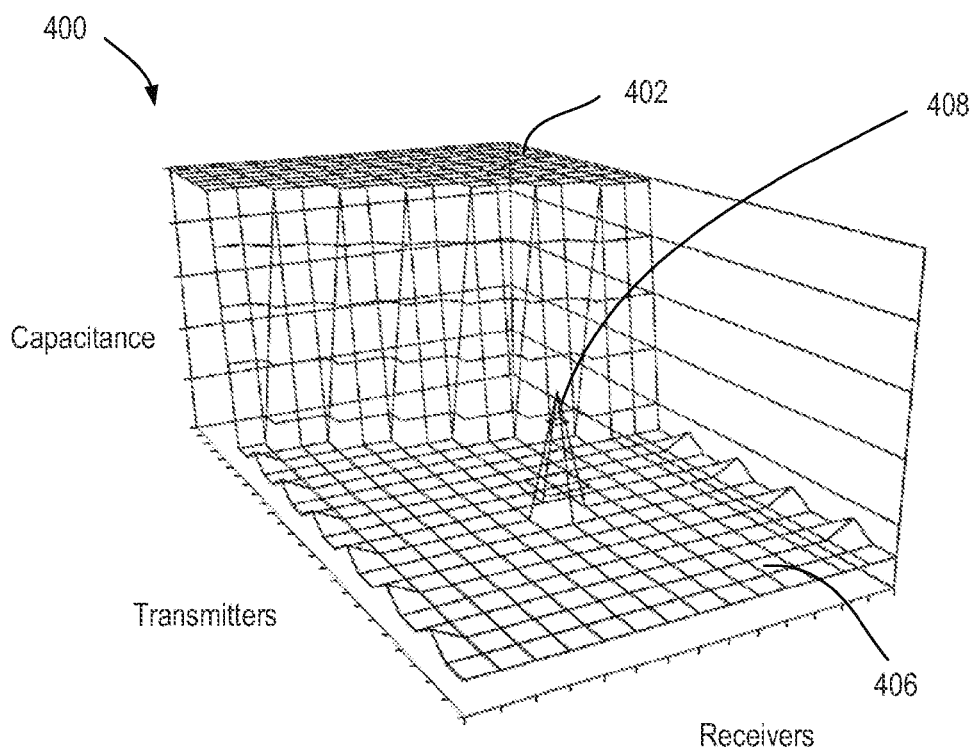
FIGS. 4A and 4B show an example capacitive image generated by a dielectric input object in the presence of a uniform conductor.
Figure 4B:
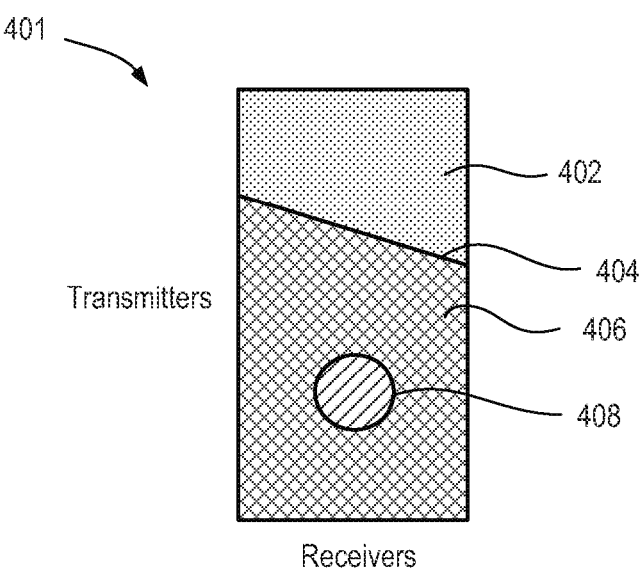

FIGS. 4A and 4B show an example capacitive image generated by a dielectric input object in the presence of a uniform conductor. FIG. 4A shows a three-dimensional graph 400 of the capacitive image, and FIG. 4B shows a flattened, two-dimensional graph 401 of the capacitive image. The graph 400 includes axes representing electrodes and capacitance. In the present example, the capacitive image is a transcapacitive image and the electrode axes represent transmitter and receiver electrodes, although a similar graph can be formed from an absolute capacitive image. The graph 401 includes axes representing the transmitter and receiver electrodes.

The graphs 400 and 401 show an unsaturated portion 402 and a saturated portion 406. The capacitive image is representative of the input surface that partially interfaces a uniform conductor. As shown in the graph 401, a line 404 represents the boundary between presence and absence of the uniform conductor. For example, the input surface can be partially submerged in water. The response 408 represents a local de-saturation in the saturated portion 406 of the capacitive image caused by a displacement of at least part of the uniform conductor from a region of the input surface.

The contrast of the response 408 with respect to the saturated portion 406 is a function of the dielectric constant to the material that displaces the uniform conductor, the distance of displacement of the uniform conductor, and the extent to which part of the uniform conductor remains between the input object and the input surface. Capacitance is inversely proportional to distance and proportional to relative permittivity of the dielectric material. Given saturated capacitive pixels of the capacitive image, displacement of the uniform conductor from a region of the input surface decreases capacitance and de-saturates the associated capacitive pixels. Higher permittivity of the dielectric material further attenuates the response 408 (i.e., the response 408 becomes less de-saturated). Likewise, more of the uniform conductor remaining between the dielectric material and the input surface further attenuates the response 408.

Figure 5A:
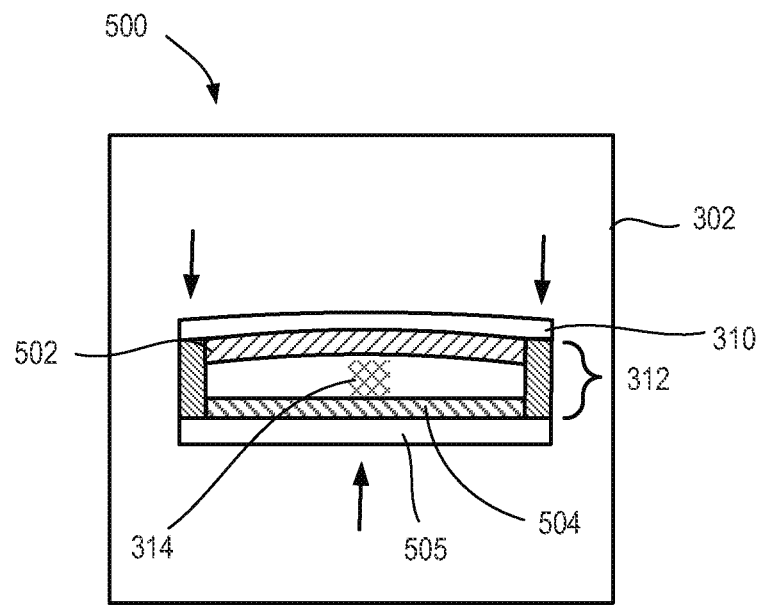
FIGS. 5A and 5B show cross-sectional side views of an input device subject to force input according to example implementations.
Figure 5B:
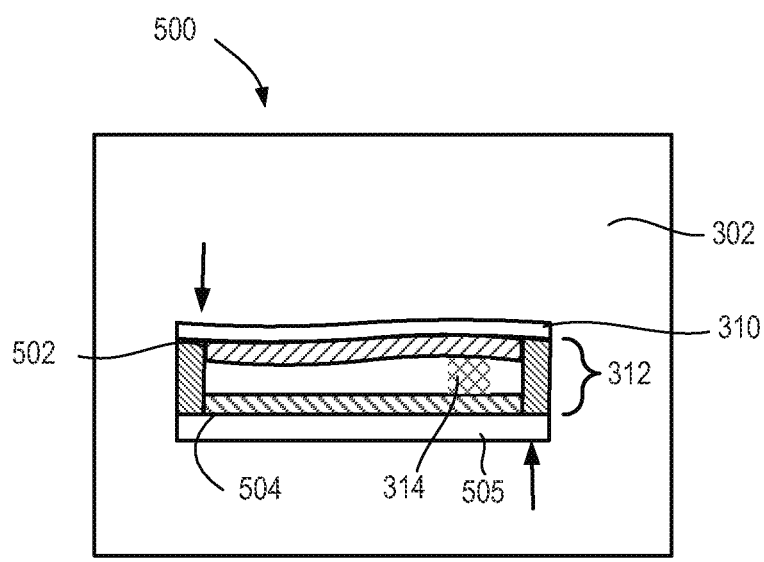

FIGS. 5A and 5B show cross-sectional side views of an input device 500 subject to forces according to example implementations. The input device 500 generally includes the input surface 310 and the capacitive sensor device 312. The input surface 310 is shown as fully interfacing the uniform conductor 302. In some examples, the input surface 310 can be partially interfacing the uniform conductor, as discussed above. The capacitive sensor device 312 includes a first electrode layer 502 and a second electrode layer 504. The second electrode layer 504 is disposed on a substrate 505. Arrows in FIGS. 5A and 5B show the forces applied to the input surface 310. The first electrode layer 502 is generally coupled to the input surface 310 such that a deflection of the input surface 310 with respect to a substrate causes a deflection of the first electrode layer 502. For purposes of clarity, the enclosure 311 is omitted from FIGS. 5A-5B.

As shown in FIG. 5A, a bending force is applied to the input surface 310 with respect to the substrate 505. The bending force deflects the input surface 310 and the first electrode layer 502 in the region 314. In the region 314, the distance between the first electrode layer 502 and the second electrode layer 504 is increased. The increase in distance between electrodes located in the region 314 will result in a decrease in capacitance between the electrodes. Thus, the bending force can cause de-saturation of the capacitance in the region 314, which can be detected as described herein.

As shown in FIG. 5B, a twisting force or torque is applied to the input surface 310 with respect to the substrate 505. The twisting force or torque deflects the input surface 310 and the first electrode layer 502. In some regions, the first electrode layer 502 moves closer to the second electrode layer 504. In other regions, such as the region 314, the first electrode layer 502 moves farther from the second electrode layer 504. The increase in distance between electrodes located in the region 314 will result in a decrease in capacitance between the electrodes. Thus, the twisting force or torque can cause de-saturation of the capacitance in the region 314, which can be detected as described herein.

Figure 6A:
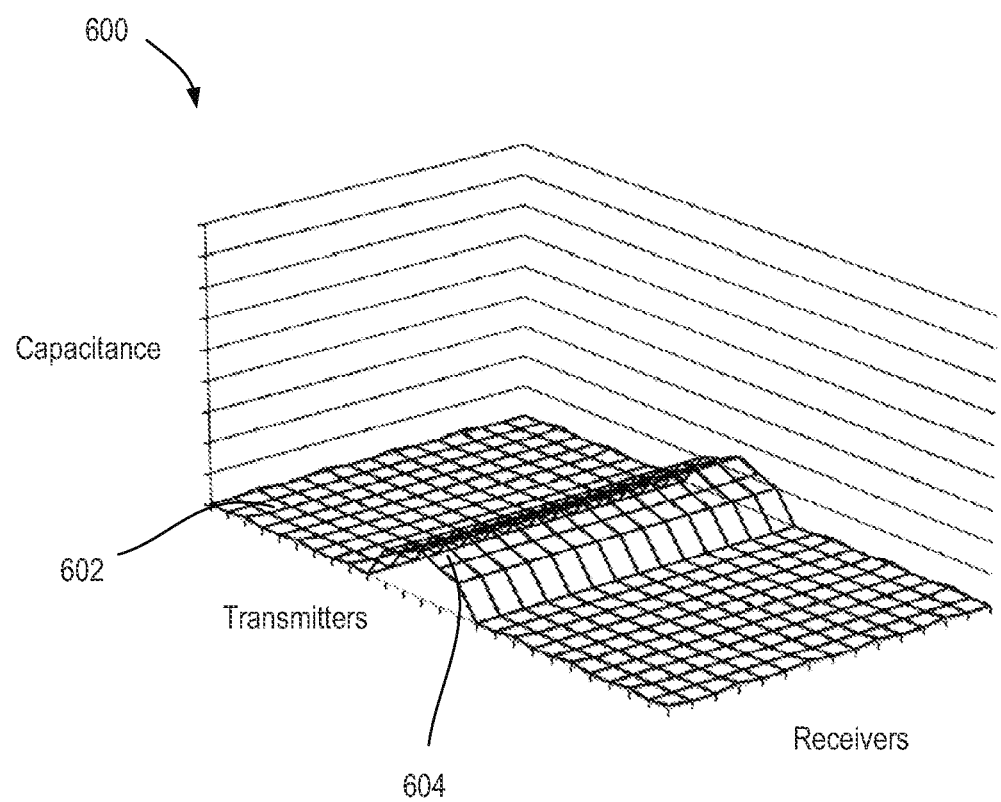
FIGS. 6A and 6B show example capacitive images generated by a force input in the presence of a uniform conductor.
Figure 6B:
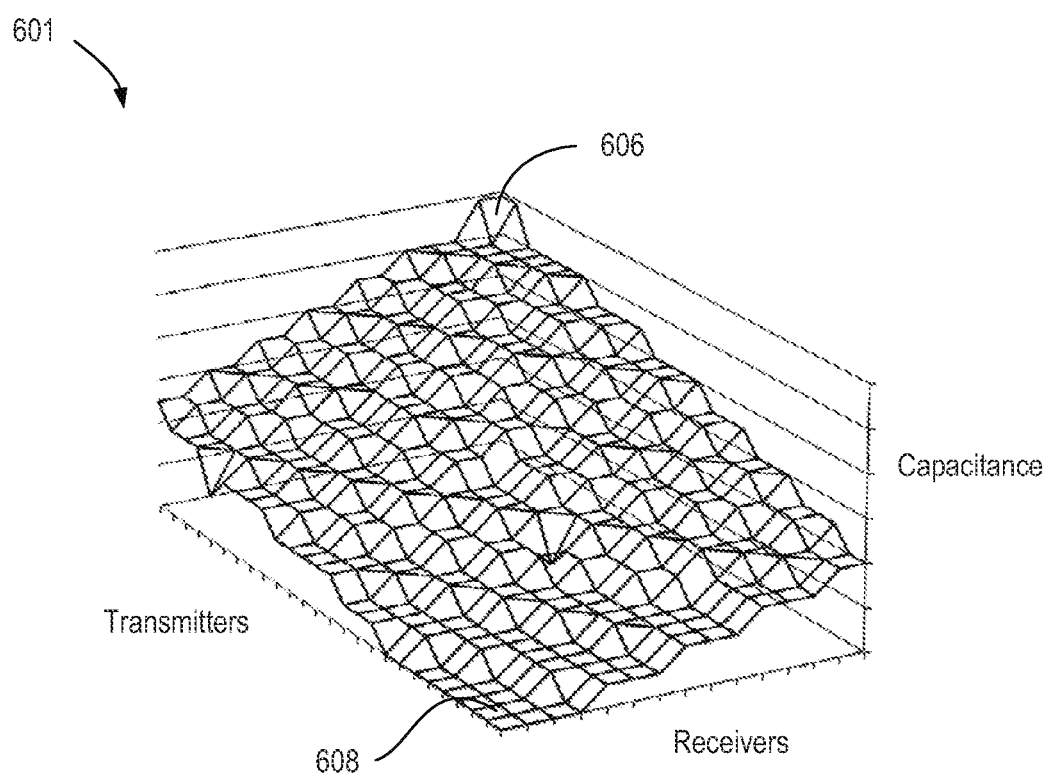

FIGS. 6A and 6B show example capacitive images generated by a force input in the presence of a uniform conductor. FIG. 6A shows a three-dimensional graph 600 of a capacitive image resulting from a bending force. FIG. 6B shows a three-dimensional graph 601 of a capacitive image resulting from a twisting force or torque. Referring to FIG. 6A, the graph 600 includes axes representing electrodes and capacitance. In the present example, the capacitive image is a transcapacitive image and the electrode axes represent transmitter and receiver electrodes, although a similar graph can be formed from an absolute capacitive image. The graph 600 shows a saturated portion 602 (e.g., the input surface completely interfaces with the uniform conductor). A deflection response 604 represents a local de-saturation in the saturated portion 602 of the capacitive image caused by the bending force. The magnitude of the deflection response 604 is a function of the increase in separation between electrode layers due to the bending force.

Referring to FIG. 6B, the graph 601 includes axes representing electrodes and capacitance. In the present example, the capacitive image is a transcapacitive image and the electrode axes represent transmitter and receiver electrodes, although a similar graph can be formed from an absolute capacitive image. The graph 601 shows a saturated portion 608 (e.g., the input surface completely interfaces with the uniform conductor). A deflection response 606 represents a local de-saturation in the saturated portion 608 of the capacitive image caused by the twisting force or torque. The magnitude of the deflection response 606 is a function of the increase in separation between electrode layers due to the twisting force or torque.

Figure 7:
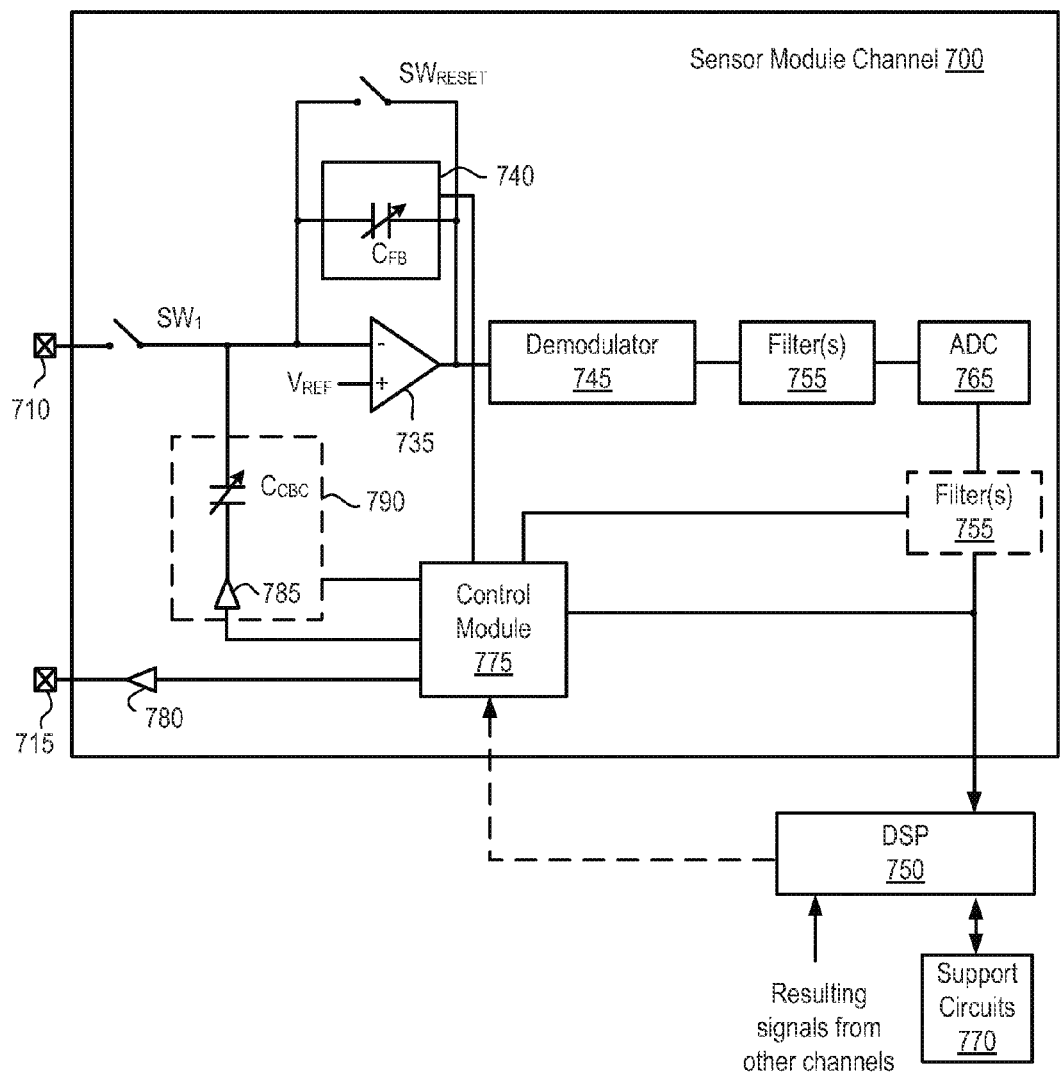
FIG. 7 is a block diagram of some components of a processing system according to an example implementation.

FIG. 7 is a block diagram of some components of the processing system 110A according to an example implementation. The processing system 110A can include a sensor module channel 700 coupled to a digital signal processor (DSP) 765. The DSP 750 can be coupled to various support circuits 770, such as memory, input/output interfaces (IO), and the like. The sensor module channel 700 can be part of the sensor module 240, and the DSP 750 and the support circuits 770 can be part of the determination module 260. While only a single sensor module channel 700 is shown, the processing system 110A can include a plurality of the sensor module channels 700 configured in similar or the same fashion. In general, the sensor module channel 700 drives a sensor electrode with a sensing signal, and receives a resulting signal in response from the sensor electrode (e.g., absolute sensing) or another sensor electrode (e.g., transcapacitive sensing). The sensor module channel 700 processes the resulting signal, which is in the charge domain, and provides the processed resulting signal to the DSP 750. The DSP 750 receives resulting signals from all of the sensor module channels 700 and determines changes of capacitance (e.g., a capacitive image and/or capacitive profile).

The sensor module channel 700 includes an integrating amplifier 735, a feedback charge collector 740, a demodulator 745, at least one analog filter ("filter(s) 755"), an analog-to-digital converter (ADC) 765, a control module 775, and a driver 780. The sensor module channel 700 can be coupled to sensor electrode(s) of the sensing device 208 through ports 710 and 715. The control module 775 is coupled to the driver 780 for generating a sensing signal, which is coupled to a sensor electrode through the port 715. The integrating amplifier 735 includes an inverting terminal (−) and a non-inverting terminal (+). The inverting terminal of integrating amplifier 735 receives a resulting signal from a sensor electrode through the port 710 and a switch $SW_1$. The switch SW can selectively couple the integrating amplifier 735 to the port 710. The non-inverting terminal of the integrating amplifier 735 is configured to receive a reference signal (e.g., $V_{REF}$).

The integrating amplifier 735 integrates and amplifies the resulting signal and provides an integrated and amplified signal to the demodulator 745. The output of the integrating amplifier 735 is also coupled to the inverting input thereof, as feedback, through the feedback charge collector 740. In some examples, the feedback charge collector 740 can be a fixed, non-adjustable capacitor. In other examples, the feedback charge collector 740 comprises an adjustable capacitance. The control module 775 can adjust the feedback charge collector 740 comprising an adjustable capacitance. A reset switch $SW_{RESET}$ is coupled in parallel with the feedback charge collector 740 and can be used to reset the integrating amplifier 735.

The demodulator 745 demodulates the integrated and amplified signal and couples a demodulated signal to the filter(s) 755 for filtering. The filter(s) 755 can, for example, mitigate noise in the demodulated signal. The filter(s) 755 provide a filtered signal to the ADC 765, which generates a digital signal. The digital signal includes samples of the processed resulting signal, which are provided to the DSP 750. In some examples, the digital signal generated by the ADC 765 can be filtered by at least one digital filter ("filter(s) 755") and then coupled to the DSP 750. The output of the filter(s) 755 or ADC 765 can be provided to the control module 775 as feedback. Alternatively, the control module 775 can obtain feedback from an earlier point in the processing chain, such as after the filter(s) 755, after the demodulator 745, or after the integrating amplifier 735. In some examples, the control module 775 can receive feedback from the DSP 750. The control module 775 can use feedback to configure the sensor module channel 700, as described below.

The DSP 750 can determine changes in capacitance by relating resulting signals to a baseline. The DSP 750 can adjust the baseline in response to transitioning between modes. That is, in response to detecting that at least a portion of the input surface interfaces a uniform conductor, the DSP 750 can determine a new baseline or restore a baseline previously determined with the uniform conductor. In response to detecting that the input surface no longer interfaces a uniform conductor, the DSP 750 can determine a new baseline or restore a baseline previously determined without the uniform conductor. The DSP 750 can offset the resulting signals to compensate for the current baseline. When a uniform conductor is detected, the DSP 750 can determine capacitance changes by relating the resulting signals from at least a subset of the sensor electrodes to the baseline. The DSP 750 can then determine presence of input and/or position of input object(s) from the capacitance changes. In an example, the DSP 750 can invert the capacitance changes (e.g., invert the capacitive image or profile) prior to determining present of input and/or position of input object(s). Inverting the capacitance changes allows the DSP 750 to use the same algorithms to determine presence and/or position regardless of mode. In another example, the DSP 750 can, through the control module 775, implement a filter in the filter(s) 755 to invert the resulting signals prior to determining the capacitance changes.

In an example, the sensor module channel 700 includes a coarse baseline correction (CBC) module 790. The CBC module 790 can include a signal generator 785 and a capacitance $C_{CBC}$. In some examples, the capacitance $C_{CBC}$ can be a fixed, non-adjustable capacitor. In other examples, the capacitance $C_{CBC}$ is adjustable by the control module 775. The capacitance $C_{CBC}$ accumulates a correction charge from a signal generated by the signal generator 785. The CBC module 790 can provide a correction signal to the inverting terminal of the integrating amplifier 735. The correction signal is combined with the resulting signal to adjust the resulting signal (e.g., the correction signal can add or subtract charge from the resulting signal).

Based on feedback, the control module 775 can control one or more of: a correction signal provided by the CBC module 790 (e.g., type, amplitude, offset, and/or phase of the correction signal); capacitance of the capacitor $C_{CBC}$; or charge collection value of the feedback charge collector 740. Adjusting the capacitance $C_{CBC}$, the correction signal, and/or the feedback charge collector 740 are tools for shaping the resulting signal. The control module 775 can adjust the capacitance $C_{CBC}$ to adjust the amount of charge that is added or subtracted from the resulting signal. Additional charge can be added to, or subtracted from, the resulting signal to compensate for a baseline. For example, the control module 775 can adjust the capacitance $C_{CBC}$ to provide a coarse baseline adjustment, and the DSP 750 can provide a fine baseline adjustment. Adjusting the amplitude and/or phase of the signal generated by the signal generator 785 facilitates adjusting the amplitude of the resulting signal. Adjusting the capacitance of the feedback charge collector 740 allows the control module 775 to control the gain of the integrating amplifier 735. The control module 775 can increase gain by decreasing feedback capacitance and decrease gain by increasing feedback capacitance. The control module 775 can perform these various adjustments to shape the resulting signal based on the feedback of the resulting signal and/or based on feedback from the DSP 750.

In an example, the sensor module channel 700 can also process the resulting signal to compensate for false input object(s). For example, if the input object includes a hydrophobic and non-conducting dielectric fluid that contacts the input surface, some of the fluid can remain on the input surface as a residue. The residue can cause a false-positive detection of input object(s). In another example, some residue of the uniform conductor can remain on the input surface (e.g., when the input surface is removed from water, some moisture can remain on the input surface). The uniform conductor residue can cause a false-positive detection of input object(s). In general, the presence and/or position of the desired input object(s) changes faster than the presence and/or position of the residues.

Accordingly, the control module 775 can selectively implement slow-forced relaxation (SFR) to compensate for false input object(s), such as the residues discussed above. In an SFR scheme, the control module 775 can implement a filter in the filter(s) 755 to filter out the portion of the response due to the false input object(s). For example, the control module 775 can implement a high-pass filter in the filter(s) 755. Generally, the portion of the response attributable to the desired input object(s) changes faster than the portion of the response attributable to the false input objects. Thus, the high-pass filter can remove the portion of the response attributable to the false input objects. The control module 775 can implement the SFR scheme based on feedback from the resulting signal, based on feedback from the DSP 750, or based on some other indication of mode, or a combination of such factors.

Figure 8:
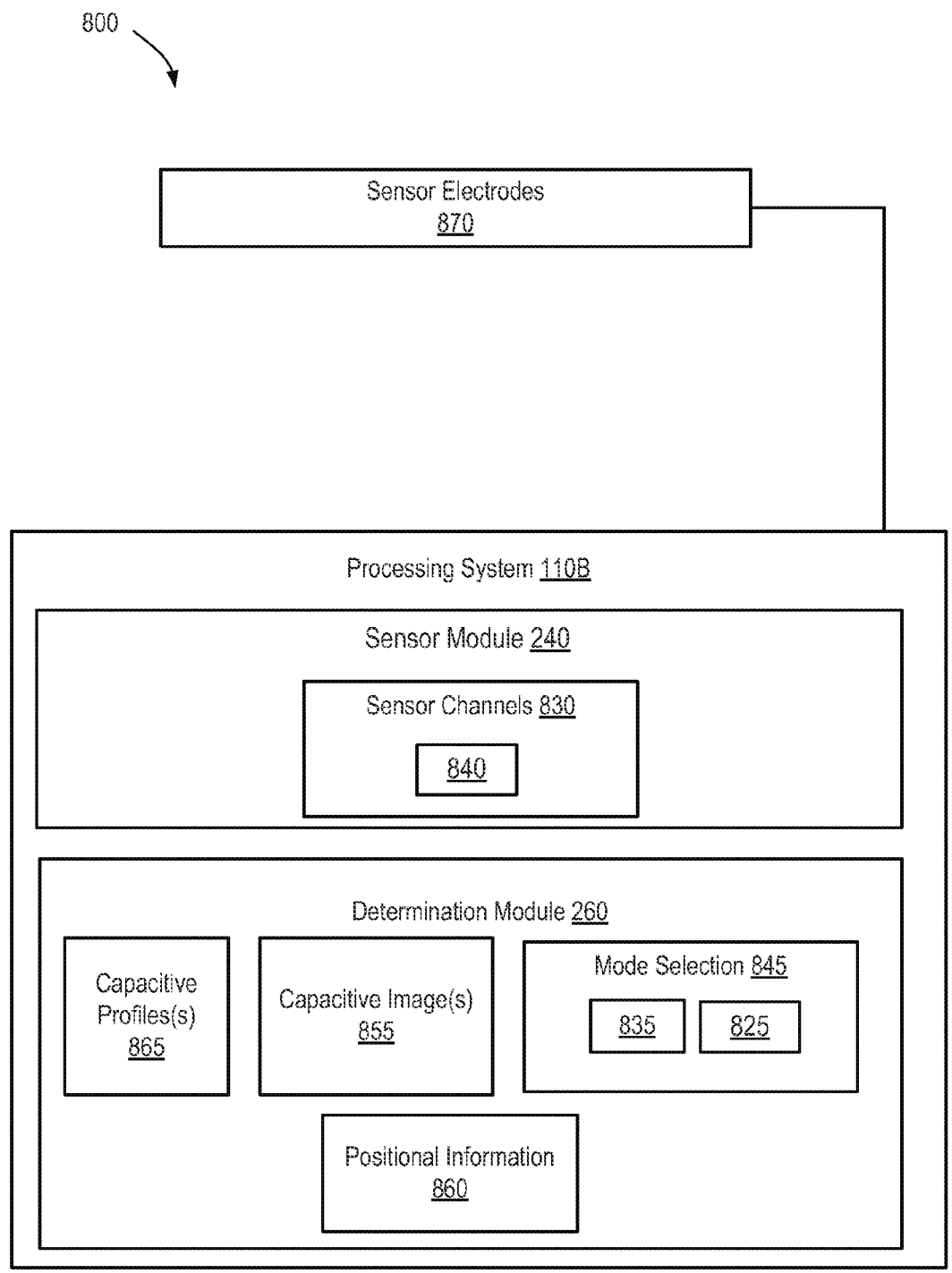
FIG. 8 is a block diagram depicting a capacitive sensor device according to an example implementation.

FIG. 8 is a block diagram depicting a capacitive sensor device 800 according to an example implementation. The capacitive sensor device 800 is an example implementation of the input device 100. The capacitive sensor device 800 includes sensor electrodes 870 coupled to an example implementation of the processing system 110 ("the processing system 110B"). The sensor module 240 includes sensor channels 830 that can be configured similar to the sensor module channel 700. The sensor channels 830 operate the sensor electrodes 870 to determine input in a sensing region of the input device by driving sensing signals and receiving resulting signals. After processing as described above, the sensor channels 830 output measured sensor signals 840.

The determination module 260 receives the measured sensor signals 840. The determination module 260 can determine capacitive profile(s) 865 and/or capacitive image (s) 855 from the measured sensor signals 840. The determination module 260 can determine positional information 860 from the capacitive profile(s) 865 and/or the capacitive image(s) 855. The determination module 260 includes a mode selection module 845 that can implement a first mode 825 or a second mode 835. The determination module 260 can implement the first mode 825 if an input surface is not interfacing a uniform conductor, and the second mode 835 if the input surface is at least partially interfacing a uniform conductor. The mode selection module 445 can dynamically switch between first and second modes.

Figure 9:
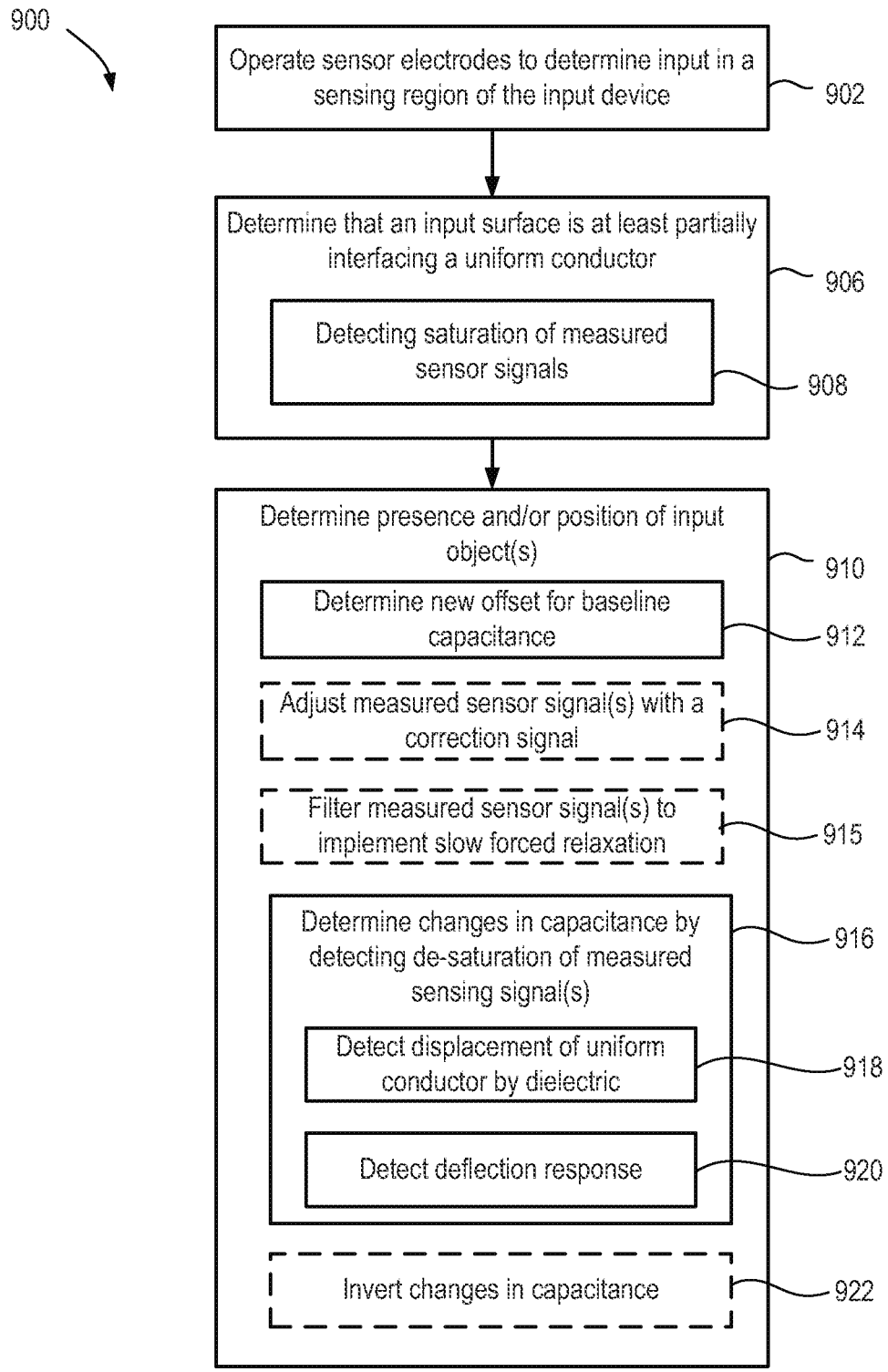
FIG. 9 is a flow diagram depicting a method of operating an input device comprising capacitive sensing using sensor electrodes according to an example implementation.

FIG. 9 is a flow diagram depicting a method 900 of operating an input device comprising capacitive sensing using sensor electrodes according to an example implementation. By way of example, method 900 may be understood with reference to the processing system 110 and the embodiments thereof discussed above. At step 902, the processing system 110 operates the sensor electrodes to determine an input in a sensing region of the input device. The processing system 110 can operate the sensor electrodes in at least one of a self-capacitance sensing scheme or a mutual capacitance sensing scheme. At step 904, the processing system 110 determines that an input surface is at least partially interfacing a uniform conductor. For example, the processing system 110 can measure saturation of sensor signals on at least a subset of the sensor electrodes.

At step 906, the processing system 110 determines presence and/or position of input object(s). The step 906 can include various steps. At step 912, the processing system 110 can determine a new offset for baseline capacitance. At optional step 914, the processing system 110 can adjust measured sensor signal(s) with a correction signal. At optional step 915, the processing system 110 can filter measured sensor signal(s) to implement a SFR scheme. At step 916, the processing system 110 can determine changes in capacitance by detecting de-saturation of measured sensor signal(s). The step 916 can include a step 918, where the processing system 110 detects displacement of the uniform conductor by dielectric input object(s), and/or a step 920, where the processing system 110 detects a deflection response. At optional step 922, the processing system 110 can invert measured changes in capacitance for further processing.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a capacitive input device, comprising:
a sensor module including sensor circuitry, the sensor module configured to:
operate a plurality of sensor electrodes to determine input in a sensing region of the input device;
a determination module configured to:
determine that an input surface of the input device is at least partially interfacing a uniform conductor; and
determine a displacement of at least part of the uniform conductor from a region of the input surface by an input object based at least in part on a change in capacitance measured on a subset of the plurality of sensor electrodes;
determine at least one of a presence or position of the at least one input object on the input surface based on the determined displacement.

2. The processing system of claim 1, wherein the sensor module is configured to operate the plurality of the sensor electrodes in at least one of a self-capacitance sensing scheme or a mutual capacitance sensing scheme.

3. The processing system of claim 1, wherein the determination module is configured to determine that the input surface is at least partially interfacing the uniform conductor by measuring a saturation of sensor signals on at least a subset of the plurality of sensor electrodes.

4. The processing system of claim 3, wherein the determination module is configured to determine the displacement by measuring de-saturation of at least one of the sensor signals.

5. The processing system of claim 1, wherein the sensor module is configured to adjust measured sensor signals on at least a subset of the plurality of sensor electrodes with a correction signal in response to the determination that the input surface is at least partially interfacing the uniform conductor.

6. The processing system of claim 1, wherein the determination module is configured to adjust an offset to compensate for a baseline capacitance in response to determining that the input surface is at least partially interfacing the uniform conductor.

7. The processing system of claim 6, wherein the determination module is configured to determine the displacement by relating measured sensor signals on at least a subset of the plurality of sensor electrodes to the offset.

8. The processing system of claim 7, wherein the determination module is configured to invert the relation between the measured sensor signals and the offset.

9. The processing system of claim 1, wherein the sensor module is further configured to determine a deflection of the input surface relative to a display overlapped by the input surface, and wherein the determination module is configured to determine presence of the input based at least in part on the deflection response.

10. The processing system of claim 1, wherein the uniform conductor is water and the input surface is at least partially submerged in the water.

11. The processing system of claim 10, wherein the at least one input object comprises a dielectric including a non-conductive elastomer, an air bubble, or a hydrophobic and non-conductive fluid.

12. The processing system of claim 10, wherein the at least one input object comprises a dielectric including a hydrophobic and non-conductive fluid, and wherein the sensor module is configured to filter measured sensor signals on at least a subset of the plurality of sensor electrodes through a high-pass filter.

13. The processing system of claim 10, wherein the determination module is further configured to determine that the input surface is no longer at least partially submerged in the water and, in response, adjust an offset to compensate for baseline capacitance.

14. The processing system of claim 13, wherein the at least one of the sensor module or the determination module is configured to adjust measured sensor signals on at least a subset of the plurality of sensor electrodes to compensate for moisture on the input surface.

15. An input device, comprising:
sensor electrodes disposed proximate an input surface; and
a processing system, coupled to the sensor electrodes, configured to:
transmit a sensing signal onto a first plurality of the sensor electrodes;
receive resulting signals comprising the sensing signal and effects of input in a sensing region from a second plurality of the sensor electrodes;
determine that the input surface is at least partially interfacing a uniform conductor based on a saturation of resulting signals from a subset of the second plurality of the sensor electrodes;
determine the presence of the input based at least in part on a displacement of at least part of the uniform conductor from a region of the input surface by a dielectric input object.

16. The input device of claim 15, wherein the uniform conductor is water and the input surface is at least partially submerged in the water.

17. The input device of claim 16, wherein the dielectric input object comprises a non-conductive elastomer, an air bubble, or a hydrophobic and non-conductive fluid.

18. A method of operating an input device comprising capacitive sensing using sensor electrodes, comprising:
driving sensing signals onto a first plurality of the sensor electrodes;
receiving resulting signals from a second plurality of the sensor electrodes;
determining that an input surface is at least partially interfacing a uniform conductor;
determining the presence of input in a sensing region of the input device based at least in part on a displacement of at least part of the uniform conductor from a region of the input surface by a dielectric input object.

19. The method of claim 18, wherein the uniform conductor is water and the input surface is at least partially submerged in the water.

20. The method of claim 19, wherein the dielectric input object comprises a non-conductive elastomer, an air bubble, or a hydrophobic and non-conductive fluid.

* * * * *